United States Patent
van Ligten

[15] 3,640,599
[45] Feb. 8, 1972

[54] SIMULATION OF AN EXTENDED INCOHERENT OBJECT SOURCE IN HOLOGRAPHY SO AS TO ELIMINATE SPECKLE NOISE

[72] Inventor: Raoul F. van Ligten, Framingham Centre, Mass.

[73] Assignee: American Optical Corporation, Southbridge, Mass.

[22] Filed: Apr. 4, 1969

[21] Appl. No.: 813,510

[52] U.S. Cl. ................................................350/3.5, 350/12
[51] Int. Cl. ...........................................................G02b 27/00
[58] Field of Search ...................................................350/3.5

OTHER PUBLICATIONS

Martienssen et al., *Physics Letters*, vol. 24A, no. 2, Jan. 1967, pp. 126-128

VanLigten et al., *Jour. of Applied Physics*, vol. 38, March 1967, pp. 1994-1996

Igerritsen et al., *IEEE Jour. of Quantum Electronics*, vol. QE-4, no. 5, May 1968, p. 376

Igerritsen et al., *Applied Optics*, vol. 7, no. 11, Nov. 1968, pp. 2301-2311

*Primary Examiner*—David Schonberg
*Assistant Examiner*—Ronald J. Stern
*Attorney*—William C. Nealon, Noble S. Williams and Robert J. Bird

[57] ABSTRACT

This specification discloses systems for recording holograms and for reconstructing images from such holograms. The object of which the hologram is to be made is illuminated with a plurality of coherent point sources of light. Light from the object forms an interference pattern with light from a reference point source of coherent light. This interference pattern is recorded to provide the hologram. In the reconstruction, a lens is provided to produce images of the reconstructions of the coherent light sources and of the reconstruction of the object. A mask is provided in the plane of the images of the reconstructed coherent sources, which mask is provided with means to transmit bundles of rays corresponding to different ones of the coherent light sources in sequence. As a result, a composite image will be produced approaching the appearance of the object illuminated by an extended incoherent source.

9 Claims, 9 Drawing Figures

INVENTOR
RAOUL F. VAN LIGTEN

BY  *Noble L. Williams*
ATTORNEY

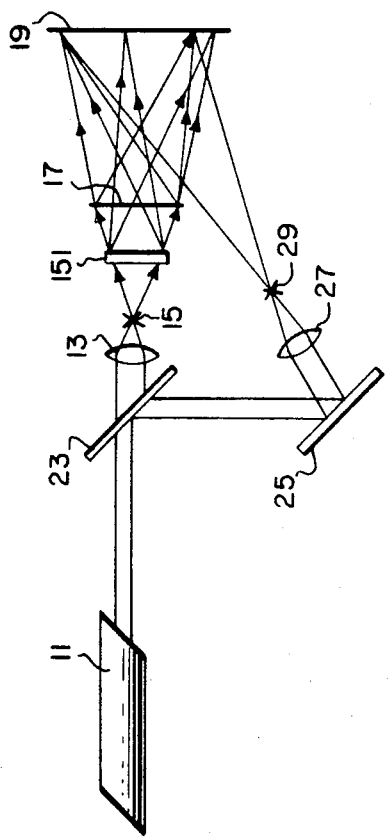
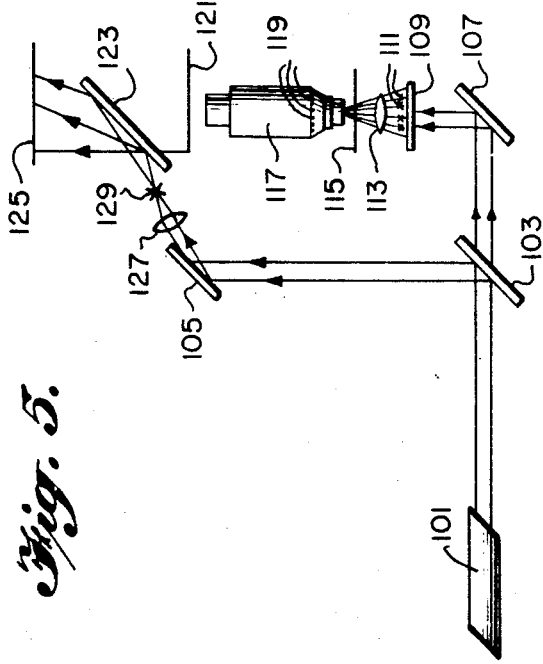
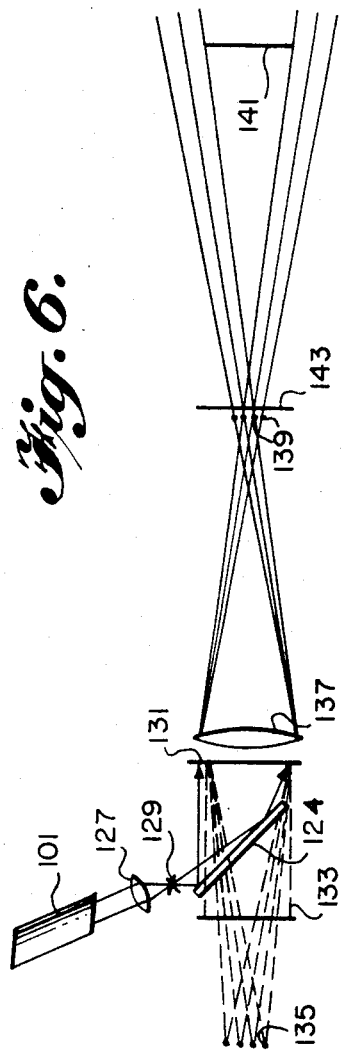
INVENTOR
RAOUL F. VAN LIGTEN
ATTORNEY

INVENTOR
RAOUL F. VAN LIGTEN

SIMULATION OF AN EXTENDED INCOHERENT OBJECT SOURCE IN HOLOGRAPHY SO AS TO ELIMINATE SPECKLE NOISE

BACKGROUND OF THE INVENTION

This invention relates to holograms and, more particularly, to recording holograms and reconstructing images therefrom which reconstructed images have the appearance of objects illuminated by an extended incoherent source.

Because holograms are produced by means of light of a single wavelength, the images that are reconstructed from the holograms in the systems of the prior art are marred by speckle patterns and diffraction effects. The system of the present invention by illuminating the object with a plurality of point light sources rather than a single point source and by providing a means for eliminating the interference pattern that would normally result from the use of a plurality of illuminating sources eliminates the speckle pattern and diffraction effects in the image that is reconstructed from the hologram and thus the reconstructed image much more nearly approaches an object illuminated by an incoherent extended source of light.

SUMMARY OF THE INVENTION

In the system of the present invention, the hologram is made in a manner similar to those of the prior art except that a plurality of point sources of light are used to illuminate the object of which the hologram is to be made instead of a single point source of light. In the reconstruction of the image recorded by the hologram, a lens is provided to focus the wave front which issues from the hologram to form a set of images of the plurality of point sources as well as an image of the object. A mask is provided in the plane of the images of the point sources formed by the lens and this mask is provided with openings in registration with the diffraction images of the point sources. These openings are made transparent in sequence to transmit bundles of rays in sequence, each bundle corresponding to a different one of the plurality of point sources which were used to illuminate the object. These sequentially transmitted bundles of rays generate in registration a sequence of images of the object. The switching between the openings in the mask is made sufficiently rapid so that the sequence of images will be seen by a viewer as a single composite image. The diffraction effects and speckle patterns in each of the sequential images will be different and will be averaged or smeared out in the composite image. Accordingly, the composite image will approach the appearance of an object illuminated by an incoherent extended source.

BRIEF DESCRIPTION OF THE DRAWINGS

FIGS. 5 and 6 illustrate the system of the present invention incorporated in a microscope;

FIGS. 7, 8 and 9 illustrate another embodiment of the invention in which the single wavelength light illuminating the object is diffused by a ground glass screen.

DESCRIPTION OF THE PRIOR ART

Figure 1:
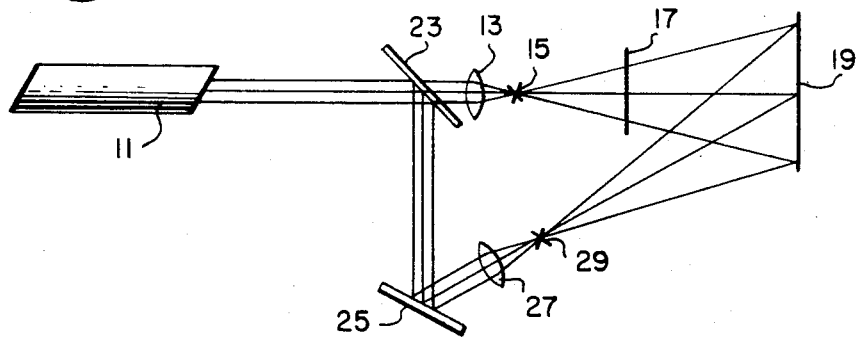
FIG. 1 illustrates a system of the prior art for making a hologram.

In the prior art system shown in FIG. 1, holograms are produced by means of a laser 11, which generates collimated light rays of a single wavelength. The light rays produced by the laser 11 are caused to pass through a common point by means of a lens 13 to provide point source 15 of light rays of a single wavelength or, in other words, a coherent point source of light. The point source 15 is used to illuminate the object 17 of which the hologram is to be made. The light from the point source 15 after being diffracted by the object 17 irradiates a sheet of film 19, which will record the incident light rays. Light from the laser 11 before being applied to the lens 13 passes through a beam splitter in the form of a half silvered mirror 23, which reflects part of the incident laser beam to a mirror 25. The mirror 25 reflects the incident laser beam to a lens 27 which causes the laser beam rays to pass through a point to provide a reference point source of light 29 of the same wavelength as the point source 15. The reference point source of light 29 also irradiates the sheet of film 19. The interference pattern formed by the two incident beams, one from the reference point source 29 and the other from the point source 15 after being diffracted by the object 17, is recorded by the film sheet 19 and can later be used to reconstruct a three-dimensional image of the object 17 in the manner described with reference to FIG. 2.

Figure 2:
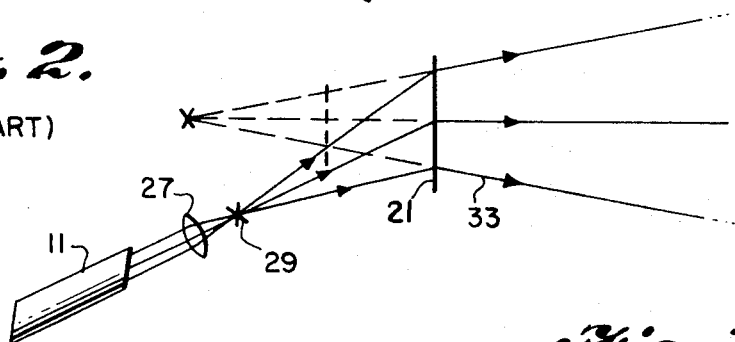
FIG. 2 illustrates a system of the prior art for reconstructing the image recorded by the hologram in FIG. 1.

As shown in FIG. 2, the collimated beam from the laser 11 is directed through the lens 27, which again causes the rays to pass through a point to provide the point source 29. The hologram, which is designated by the reference number 21, is a positive made from the negative which is produced on the film sheet 19 by the system of FIG. 1. The hologram 21 or the negative 19 itself is placed in the same position with respect to the point source 29 that the film sheet 19 occupied in FIG. 1 so that the hologram receives the rays from the point source 29. The hologram 21 will act on the rays incident thereon to produce a wave front issuing from the hologram in the direction indicated by the arrows 33. This wave front will be the same as the wave front produced by the system of FIG. 1 at the film sheet 19. As a result a person positioned to receive the wave front issuing from the hologram illuminated as illustrated in FIG. 2 will see a three-dimensional image of the object 17. The image of the object 17 produced in this manner is referred to as a reconstruction of the object. Because the reconstruction is by means of light of a single wavelength, the reconstructed image will be marred by a speckle pattern and the diffraction effects.

DESCRIPTION OF THE PREFERRED EMBODIMENTS

Figure 3:
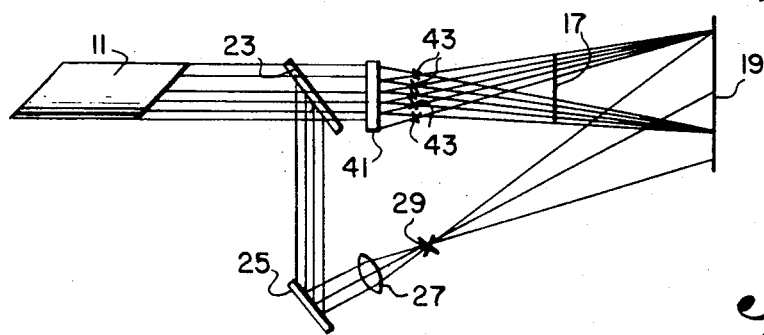
FIG. 3 schematically illustrates a system of making a hologram in accordance with the present invention.

In the system of the present invention, the speckle patterns and diffraction effects are eliminated and the resulting image very closely approaches the appearance of a three-dimensional object illuminated with an extended incoherent light source. In the system of the present invention, as shown in FIG. 3, the hologram is also recorded by means of the laser 11, which produces a collimated beam of light of a single wavelength. This collimated beam after passing through the beam splitter 23 is applied to an optical system 41 which may be a hologram of a plurality of point sources, and which instead of causing the light rays to pass through a single point, causes the light rays to pass through a plurality of points arranged in a predetermined pattern in a plane to provide a plurality of point sources of light 43. The plane need not be planar. It could be a wavy spatial surface. The point sources 43 being of a single wavelength are described as being mutually coherent. The point sources of light 43 illuminate the object 17, which diffracts the light rays before they irradiate the film sheet 19. As in the system of FIG. 1, the beam splitter 23 reflects part of the laser beam to a mirror 25, which reflects the incident rays to the lens 27 to produce the reference point source of light 29. The point source 29 as in the system of FIG. 1 irradiates the film sheet 19 and the resulting interference pattern is recorded by the film sheet 19 and this photographic recording provides the hologram. Thus the difference in the system of FIG. 3 from that of FIG. 1 is that the object 17 is illuminated by a plurality of point sources of light each of the same wavelength rather than by a single point source of light.

Figure 4:
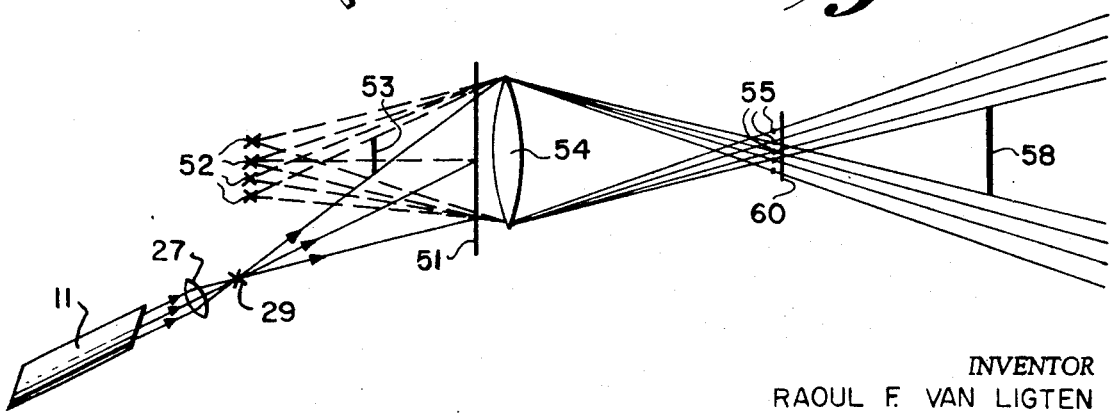
FIG. 4 schematically illustrates a system of the present invention for reconstructing the image recorded by the hologram in the system of FIG. 3.

To reconstruct the object 17 from the hologram made as described with reference to FIG. 3, the system illustrated in FIG. 4 is used. The beam from the laser 11 is condensed by the lens 27 into the point source 29 and the hologram which was made by the system illustrated in FIG. 3 preferably is positioned at the same position with respect to the point source 29 that the film sheet 19 occupied with respect to this point source in the system of FIG. 3. The point 29 need not be at precisely the same position. It can be moved axially along the projection path. In FIG. 4, the hologram is designated by the reference number 51. Light rays from the point source 29 will pass through the hologram 51 and on passing therethrough will produce a wave front which is the same as that produced in the system of FIG. 3 at the film sheet 19. Accordingly, a reconstruction 53 of the object and reconstructions 52 of the mutually coherent sources 43 would appear to a viewer receiving this light wave front. The plurality of coherent sources illuminating the object 17 in the system of FIG. 3 will create an interference pattern which would be seen by an observer viewing the object 17. Accordingly, if a viewer were to directly receive the wave front produced by the hologram 51 when illuminated by the source 29 as illustrated in FIG. 4, the viewer would see the reconstruction 53 of the object with the interference pattern caused by the plurality of sources 43. To eliminate this interference pattern, a lens 54 is provided adjacent to the hologram 51 to produce images 55 of the reconstructions 52 of the coherent point sources 43 and an image 58 of the reconstruction 53 of the object 17. A mask 60 located in the plane of the images 55 is provided with openings, each positioned in registration with a different one of the images 55 of the reconstructions of the coherent sources. The openings in the mask 60 are normally opaque and are made transparent in sequence so that only one of the openings is transparent at any given time. The openings in the mask may be considered to be light valves which could be implemented by apertures in a plate which are uncovered and covered in sequence by a rotating member. As each opening is made transparent, a bundle is transmitted through the opening to form the image 58. Thus, the image 58 actually is a sequence of images in registration, each formed by a bundle of rays passing through a different one of the openings in the mask 60. The switching of the transparency among the openings in the mask 60 is made sufficiently rapidly that the sequence of images seen by a viewer appears as a single composite image. Since each of the openings in the mask 60 is positioned in registration with a different one of the images 55 of the reconstructions 52 of the coherent sources 43, each of the sequential images 58 will be produced by light corresponding to a different one of the reconstructions 52. As a result, each of the sequential images 58 seen by the viewer would appear to be illuminated by only a single one of the coherent sources 43 and the illuminating source would appear to change its position as each new sequential image 58 is produced. Each of the sequential images which form the image 58 since they are produced in effect by a single coherent source will contain the undesirable speckle pattern and diffraction effects which are produced in the single coherent source system illustrated in FIGS. 1 and 2. However, because each of the coherent sources which, in effect, produce the sequential images are displaced from one another, the speckle pattern and diffraction effects in the resulting sequential images which form the image 58 will also be displaced from one another. As a result, the speckle pattern and the diffraction effects are averaged out in the composite image 58 and the resulting composite image 58 closely approaches the appearance of an object illuminated with an incoherent extended source.

Preferably, the plurality of coherent point sources 43, which are used to illuminate the object when the hologram is being produced, should be sufficiently spaced so that the reconstructed point sources do not overlap. Such overlapping will occur if the point sources are not sufficiently spaced because the object 17 will diffract and scatter the light incident thereon and make the reconstructed point sources 52 larger than the original point sources 43. Accordingly, if the point sources 43 are not sufficiently spaced, the images 55 of the reconstructed sources 52 will overlap and rays corresponding to more than one reconstructed point source will pass through a given aperture when it is made transparent. As a result of rays corresponding to more than one point source passing through a given aperture, an interference background would be produced at the image 58. While it is preferable that the point sources be sufficiently spaced to avoid this problem, it is not essential that the point sources have this spacing because the rays corresponding to a given point source will always be dominant in the transmission through the corresponding opening and the spillover from the other point sources will be different for each opening. Accordingly, the interference patterns which result from the spillover will average out in the composite image.

For example, the point sources should be spaced apart a minimum distance equal to the equivalent of a numerical aperture of 0.5 in air. The openings in the mask 60 can be of a maximum size of equivalent magnitude. For a microscope objective of the type shown in FIG. 5 with a magnification of 50 X, the separation of the points that illuminate the object would be 1.7 millimeters. In the FIG. 6 arrangement, the apertures in the mask 143 would have a maximum diameter of a size corresponding to the distance of the points 139 impinging thereupon.

The resolution that is produced in the image 58 depends upon the size of the openings in the mask 60. The smaller the openings in the mask 60, the less resolution of the image 58 will be. The openings in the mask 60 preferably are made large enough to retain the inherent resolution in the overall system.

FIG. 5 illustrates the incorporation of the system of the present invention in a microscope. As shown in FIG. 5, a laser 101 generates a collimated beam of light of a single wavelength. This beam is directed onto a beam splitter 103 to reflect a portion of the beam to a mirror 105 and permit the rest to pass through to a mirror 107. The mirror 107 reflects the collimated beam incident thereon to a lens system 109 which condenses the beam to pass through a plurality of points to thus form a plurality of point light sources 111 arranged in a plane. Light from the point sources 111 is passed through a condensing lens 113 and illuminates the object 115 of which a magnified hologram is to be made by means of the microscope. The lens system of the microscope represented generally by the reference number 117 produces images 119 of the plurality of coherent sources 111 and produces a magnified image 121 of the object 115. The light wave front forming the image 121 passes through a beam splitter 123 to fall upon the film sheet 125, which is to record the interference pattern to provide the hologram.

The portion of the laser beam reflected to the mirror 105 is reflected by the mirror 105 to a lens 127, which condenses the incident beam to pass through a point to provide a point source of light 129. The light from the source 129 is reflected by the beam splitter 123 to the film sheet 125 to form an interference pattern with the rays coming from the image 121 and this interference pattern is recorded by the film sheet 125.

FIG. 6 illustrates how the hologram made as described with reference to FIG. 5 is used to reconstruct the magnified image of the object. As shown in FIG. 6, the hologram is designated by the reference number 131. Collimated light from the laser 101 is condensed by the lens 127 into the point source of light 129 which is reflected to the hologram 131 by the mirror 124. The hologram 131 is located in the same position with respect to the mirror 123 and the point source 129 that the film sheet 125 was located in the system of FIG. 5. As a result, a wave front will issue from the hologram 131 to form a reconstruction 133 of the magnified image 121 of the object and to form a reconstruction 135 of the images 119 of the coherent light sources. A lens 137 is provided to focus the wave front issuing from the hologram 131 to produce images 139 of the reconstructions 135 of the images 119 of the coherent point sources and an image 141 of the reconstruction 133 of the magnified image. A mask 143 is provided in the plane of the images 139 of the reconstructed coherent light source images. An opening is provided in the mask 148 in registration with each of the images 139 and these openings being normally opaque are made transparent in sequence in the same manner as described above with reference to FIG. 4. As a result, a bundle of rays will be transmitted sequentially through the openings in the mask 143, each bundle of rays producing the image 141 of the magnified object. Thus, the image 141 is actually a sequence of images each formed by a different bundle of rays passing through a different opening in the mask 143. Since the speckle patterns and the diffraction effects which are produced by each of the bundle of rays are displaced from one another, these undesired effects are averaged out and the magnified object 141 has the appearance of an object illuminated by an incoherent extended source.

Figure 8:
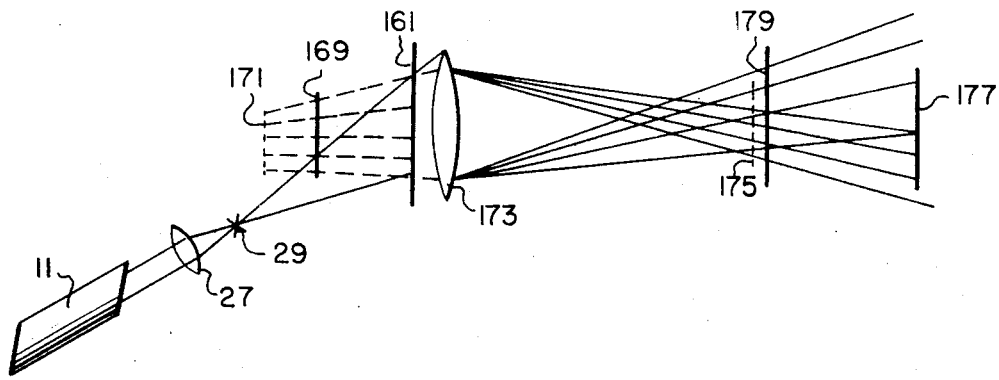

FIG. 7 illustrates a system for making a hologram in accordance with another embodiment of the present invention and FIG. 8 illustrates the system for reconstructing an image of the object from the hologram made by the system of FIG. 7. The system of FIG. 7 is structurally the same as that illustrated in FIG. 1 except that a ground glass screen 151 is placed between the point source 15 and the object 17. The ground glass screen, in effect, converts light from the point source 15 into a large number of mutually coherent point light sources illuminating the object.

Figure 9:
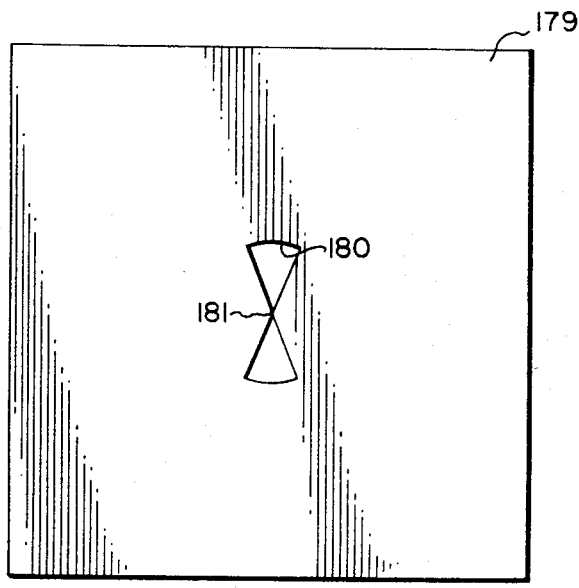

In FIG. 8, the hologram made by the system shown in FIG. 7 is designated by the reference number 161. As in the system of FIG. 3, the laser 11 produces a collimated beam which is condensed into the point source 29 by means of the lens 27. The point source 29 illuminates the hologram 161 which is located with respect to the point source 29 to have the same position relative thereto that the film sheet 19 has to the point source 29 in the system of FIG. 7. As a result of illuminating the hologram 161 in this manner, a wave front will issue from the hologram which is the same as the wave front that existed and was recorded by the film sheet 19 in the system of FIG. 7. As a result, an image of the object recorded by the hologram in the system of FIG. 7 is reconstructed and this reconstruction is designated by the reference number 169 in FIG. 8. In addition, the large number of point sources produced by the ground glass screen 151 is reconstructed and this reconstruction is designated by the reference number 171. The wave front issuing from the hologram 161 which provides the reconstructions 169 and 171 is focused by a lens 173 to produce an image 175 of the reconstruction 171 of the ground glass screen and an image 177 of the reconstruction 169 of the object. A mask 179 is positioned in the plane of the image 175. FIG. 9 is a plan view of the mask and shows the shape of an aperture 180 formed in the mask. The mask 175 is rotated about the optic axis of the lens 173 and the point 181 on the mask 179 is positioned on this optic axis. The shape of the opening shown in FIG. 9 is exemplary only as the aperture can take many different shapes as long as it provides an aperture on the diameter of the optic axis for all portions of the mask. The length of the aperture along the diameter is set by the resolution requirements to sharply reconstruct the image of the object. The resulting image 177 produced by the system shown in FIG. 8 will approach that of an object illuminated by an extended incoherent source because the ground glass screen used to illuminate the object simulates a large number of point sources. Although the point sources are closely spaced so that light from more than one point source passes through the aperture in the mask at any given time, the resulting interference pattern will be different for each different position of the aperture. Accordingly, the interference patterns will be averaged out in the composite image. Note in this embodiment, the plural light sources or spots are not spaced apart in a regular pattern. Some sources may even overlap. When the points are not spaced in a regular pattern, as described elsewhere herein, more sources are needed as provided by the ground glass to assure the averaging out.

In each of the above-described embodiments, the undesired speckle patterns and diffraction effects are eliminated from the image reconstructed from the hologram. Accordingly, the image closely approaches the appearance of the object when illuminated by an incoherent extended light source.

The hologram 41 may be made by assembling an array of beam splitters in a three-dimensional gridlike pattern. A single source of collimated light is directed toward the assembly in such a way that a plurality of spacial focused beams emerge and form a pattern of points on a film. Of course, there must be provided a coherent reference beam which intersects all of the spacial focused beams at the plane of the film. There is thus formed a hologram of spaced points or spots of light.

Other means may be provided to obtain the plural points of light. For example, the gridlike arrangement itself could be used. A pair of diffraction gratings may be assembled at right angles to each other. A collection of single mode optical films can be used.

An array of small lenses is useable. For example, a hexagonally packed group of hexagon-shaped lenses is very suitable.

The above description is of preferred embodiment of the present invention and many modifications may be made thereto without departing from the spirit and scope of the invention, which is defined in the appended claims.

I claim:

1. A system for reconstructing the image from the hologram recorded by the simultaneous irradiation of an object by plural discrete point sources of object light comprising:

means to generate a reference light source coherent with said plural discrete point sources and direct the same to irradiate said hologram to provide a reconstruction of said object and reconstructions of said plural point sources of light, a lens positioned to receive the light rays passing through said hologram and to focus said light rays to produce an image of the reconstruction of said object and images of the reconstructions of the plural point sources of light, a mask positioned near the images of the reconstruction of the plural point sources of light said mask defining apertured light valves and each aligned with a different one of the reconstructions of the plural point sources of light, said mask including means for making said light valves normally opaque and rendering said light valves transparent in sequence.

2. A system for reconstructing an image of an object from a hologram which is recorded by illuminating said object with a plurality of mutually coherent point sources of light comprising:

means to illuminate said hologram with a coherent wave front of light in a manner to generate a reconstruction of an image of said object and reconstructions of said point sources of light, means to focus the light passing through said hologram into images of the reconstructions of the coherent point sources and into an image of the reconstruction of said object, a mask positioned near said images of the reconstructions of the point sources, said mask including means to transmit bundles of rays corresponding to different ones of the coherent point sources in sequence to form a composite image of the reconstruction of said object made up of sequential images formed by said sequentially transmitted bundles of rays, said mask effective to block out light corresponding to the coherent sources other than that transmitted at any one time.

3. A system as recited in claim 2 wherein said plurality of coherent point sources are arranged in a plane and wherein said mask is positioned in the plane of the images of the reconstructions of the point sources.

4. A system as recited in claim 3 wherein said mask defines a plurality of openings each coincident with an image of a different one of said reconstructions of the coherent point sources and wherein said mask includes means to make said openings normally opaque and renders the openings transparent in sequence.

5. A system as recited in claim 2 wherein said plurality of coherent sources is effected by a ground glass screen illuminated by a coherent light source and wherein said mask comprises a plate rotatable about the optic axis of said lens and containing an aperture on a diameter passing through said axis.

6. A method of reconstructing an image of an object from a hologram which was made of said object by illuminating said object simultaneously with a plurality of coherent point sources of light, comprising the steps of:
irradiating said hologram with a reference coherent source in a manner to generate reconstructions of the point sources and of said object, focusing the light that passes through said hologram to form images of the reconstructions of the point sources, and transmitting the bundles of light rays forming the images of the reconstructions of the point sources in sequence to an image of the reconstruction of said object formed by said bundles of light rays.

7. A method as recited in claim 6 wherein all of the light sources which illuminated said object to make said hologram were spaced from one another.

8. A method as recited in claim 6 wherein said plurality of coherent sources are formed by a ground glass screen.

9. A system for reconstructing a holographic image of an object which has been recorded with simultaneous illumination by a plurality of light sources, including:
means to illuminate said hologram with coherent reconstruction light to generate a reconstruction of a real image of the object and of the plurality of light sources,
a mask defining an aperture and disposed substantially in the plane of the reconstructed light sources to transmit one or more of the images of said sources and to blank out the remainder of same,
means to sequentially register said aperture with one or more of said reconstructed light sources to sequentially transmit said source images, thus to effect a continuous reconstruction of the holographic image from different of said source images.

* * * * *